US007042807B1

(12) United States Patent
Breen

(10) Patent No.: US 7,042,807 B1
(45) Date of Patent: May 9, 2006

(54) MEDICATION REMINDER APPARATUS

(76) Inventor: Don E. Breen, 672 Sleepy Hollow, Milford, MI (US) 48381

( * ) Notice: Subject to any disclaimer, the term of this patent is extended or adjusted under 35 U.S.C. 154(b) by 0 days.

(21) Appl. No.: 11/247,761

(22) Filed: Oct. 12, 2005

(51) Int. Cl.
*G04B 47/00* (2006.01)
*B65D 83/04* (2006.01)
*G06F 17/00* (2006.01)

(52) U.S. Cl. .......................... 368/10; 206/538; 221/15; 700/237

(58) Field of Classification Search .................. 368/10; 221/2, 3, 15
See application file for complete search history.

(56) References Cited

U.S. PATENT DOCUMENTS 4,962,491 A 10/1990 Schaeffer
5,020,037 A 5/1991 Raven
5,099,463 A 3/1992 Lloyd et al.
5,200,891 A 4/1993 Kehr et al.
5,408,443 A 4/1995 Weinberger
D393,203 S 4/1998 Saltzman et al.
6,018,289 A 1/2000 Sekura et al.
6,626,358 B1 * 9/2003 Breimesser et al. ........ 235/380
2004/0117062 A1 * 6/2004 Bonney et al. ............. 700/237
2004/0158350 A1 * 8/2004 Ostergaard et al. ......... 700/231
2005/0258066 A1 * 11/2005 Conley ....................... 206/538

* cited by examiner

*Primary Examiner*—Vit W. Miska
(74) *Attorney, Agent, or Firm*—Crossley Patent Law; Mark A. Crossley

(57) ABSTRACT

A medication reminder apparatus, comprising a parallelepiped case with an electric clock, a processor within the case communicating with the clock, an electronic punch card reader within the case communicating with the processor, a punch card with columns, each column comprising a medication identification and a corresponding number of punch holes, each punch hole read by the punch card reader, reminder tabs caused to release by a motor controlled by the processor whereby a user is reminded what medications to take when.

13 Claims, 4 Drawing Sheets

MEDICATION REMINDER APPARATUS

BACKGROUND OF THE INVENTION

It can be quite difficult to remember which medicine to take and when, especially when an individual is faced with taking many medications. Some medications are taken only once daily while some are taken four times per day, as example. What is needed is a basically designed mechanism that is clock driven, a mechanism which holds medication reminders and reminds a user which medications to take and when. The ideal apparatus should be designed to also accommodate the blind, so that one without sight can identify medication schedules also. The present invention fulfills these needs.

FIELD OF THE INVENTION

The invention relates to medication scheduling and dosages and more specifically to a medication reminder apparatus which reminds a user which meds to take, how many, and when to take them.

SUMMARY OF THE INVENTION

The general purpose of the medication reminder apparatus, described subsequently in greater detail, is to provide a medication reminder apparatus which has many novel features that result in an improved medication reminder apparatus which is not anticipated, rendered obvious, suggested, or even implied by prior art, either alone or in combination thereof.

To accomplish this, the invention comprises a medication reminder apparatus, comprising a parallelepiped case with an electric clock. The clock is disposed in a side of the case and visible therein. A processor is within the case in communication with the clock. An electronic punch card reader is within the case. The punch card reader is fed by a card slot in the top of the case. The punch card reader communicates with the processor. Each punch card is comprised of columns. Each column comprises a medication number and a corresponding number of punch holes. Each punch hole is read by the punch card reader. The reminder tabs are mechanically caused to release by a motor controlled by the processor. The motor drives a camshaft which drives lobe cam outputs. Each lobe cam output is associated with a reminder tab. The single cam lobe output drives the release of the 1 daily labeled reminder tab. The dual cam lobe output drives the release of the 2 daily labeled reminder tab. The triple cam lobe output drives the release of the 3 daily labeled reminder tab. Likewise, the quadruple cam lobe output drives the release of the 4 daily reminder tab. As the pivotal release of the reminder tab is actuated, the tab pivots downward to reveal the dosage instruction reminder. Bottle of pills are conveniently held atop the case. Reservoirs of reminders are disposed within the case above each appropriate reminder tab so that each reminder tab is associated with the correct reminder count for meds for which a user is reminded. A refillable reservoir holds reminders for dispensing. The reminders are offered in various examples and include marbles, pill-like reminders, and other such appropriate single objects. The reminders are dispensed from the front of the case of the invention as per the commands of the clock, card reader, and related components. Those taking medications are thereby reminded what to take and how many times per day to take the medication by the reminders. The invention is offered in various examples which provide for holding and scheduling various numbers of medications. A basic example schedules and holds up to four medications. An example of a more complete version of the invention is capable of holding and scheduling up to 12 medications. A thumb print recognition pad is provided for security measures, as well as to prevent confusion if more than one person utilizes the invention in an environment. The thumb print recognition pad communicates with the processor to identify the user, such that individualization is possible, in a secure mode.

Thus has been broadly outlined the more important features of the medication reminder apparatus so that the detailed description thereof that follows may be better understood and in order that the present contribution to the art may be better appreciated.

Numerous objects, features and advantages of the medication reminder apparatus will be readily apparent to those of ordinary skill in the art upon reading the following detailed description of presently preferred, but nonetheless illustrative, examples of the medication reminder apparatus when taken in conjunction with the accompanying drawings. In this respect, before explaining the current examples of the medication reminder apparatus in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the medication reminder apparatus. It is therefore important that the claims be regarded as including such equivalent constructions insofar as they do not depart from the spirit and scope of the present invention.

Objects of the medication reminder apparatus, along with various novel features that characterize the invention are particularly pointed out in the claims forming a part of this disclosure. For better understanding of the medication reminder apparatus, its operating advantages and specific objects attained by its uses, refer to the accompanying drawings and description.

DETAILED DESCRIPTION OF THE DRAWINGS

With reference now to the drawings, and in particular FIGS. 1 through 5 thereof, example of the medication reminder apparatus employing the principles and concepts of the present invention and generally designated by the reference number 10 will be described.

Figure 1:
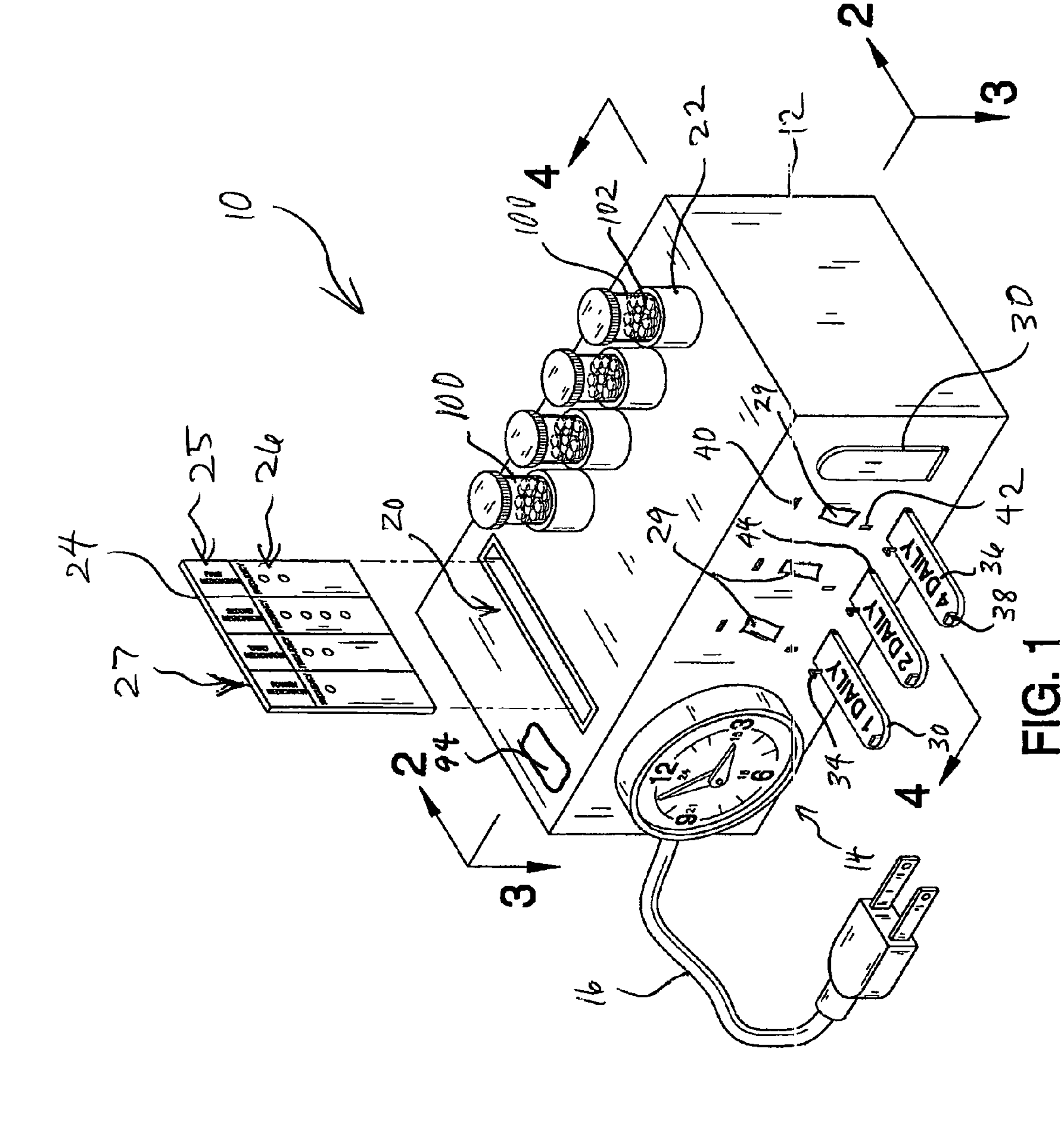
FIG. 1 is a perspective view of the invention, the example equipped for scheduling up to 4 different medication reminders.
Figure 2:
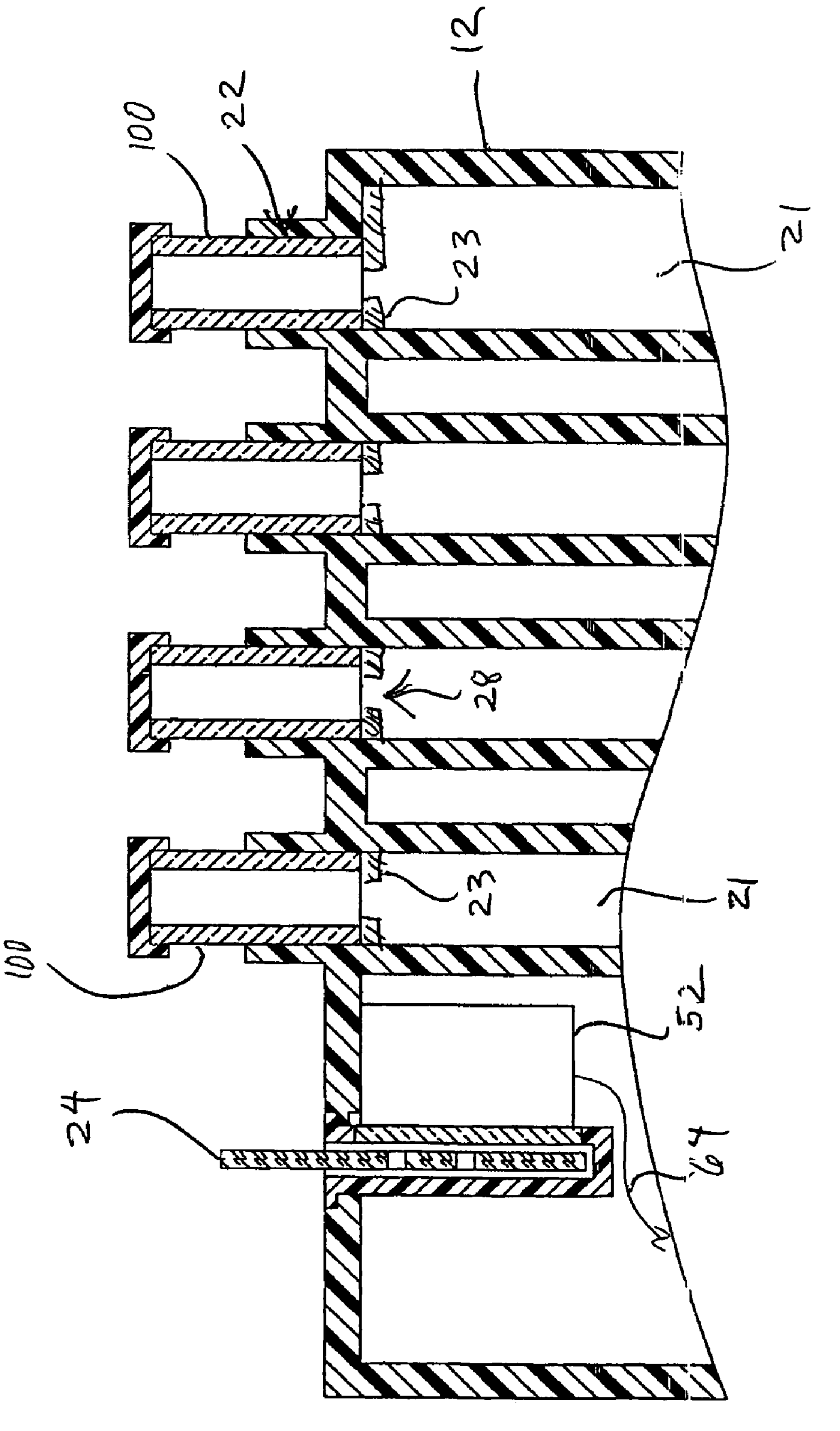
FIG. 2 is a front cross sectional view of the invention in FIG. 1, taken along the line 2—2.
Figure 3:
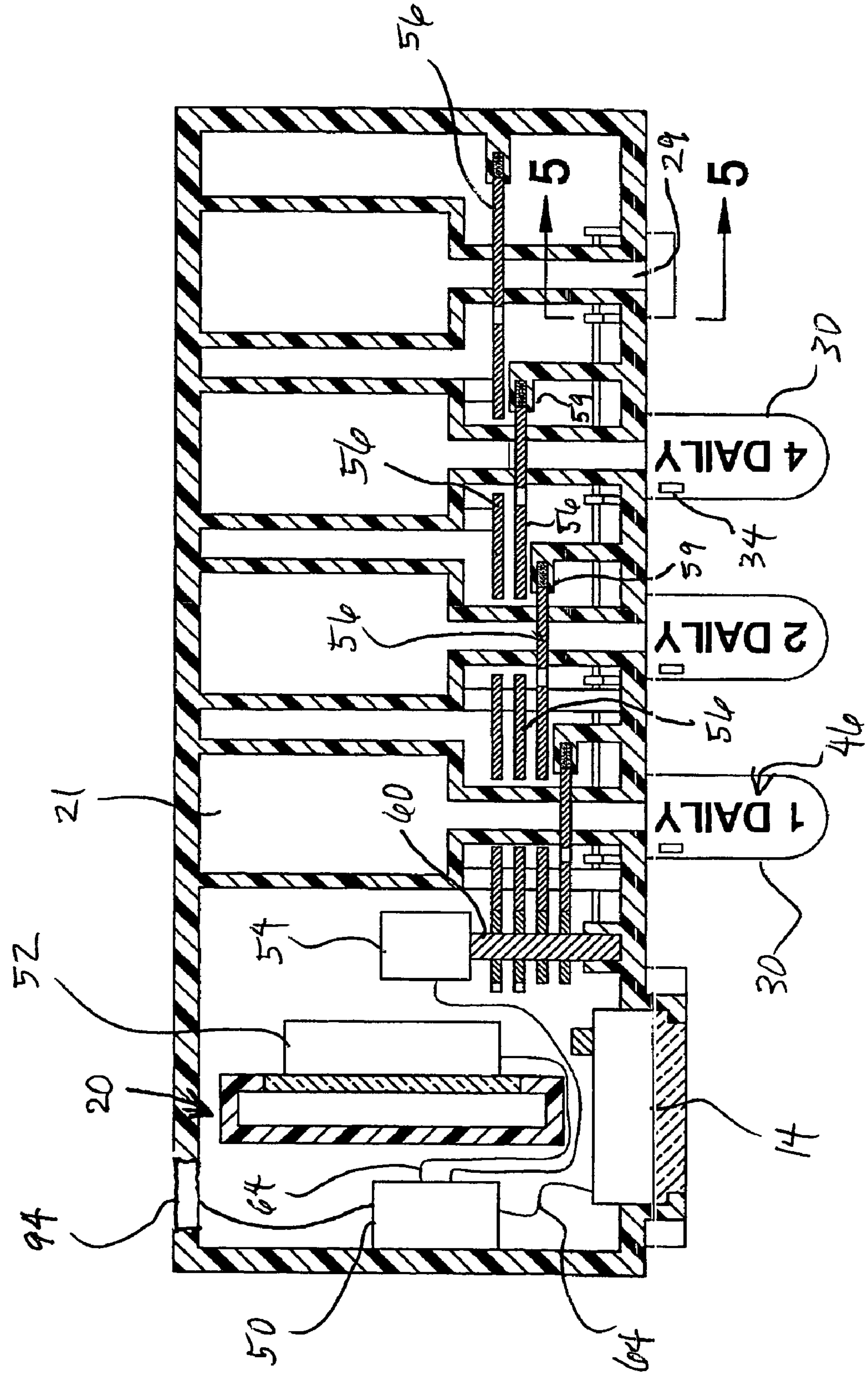
FIG. 3 is a top cross sectional view of the invention of FIG. 1, taken along the line 3—3.
Figure 4:
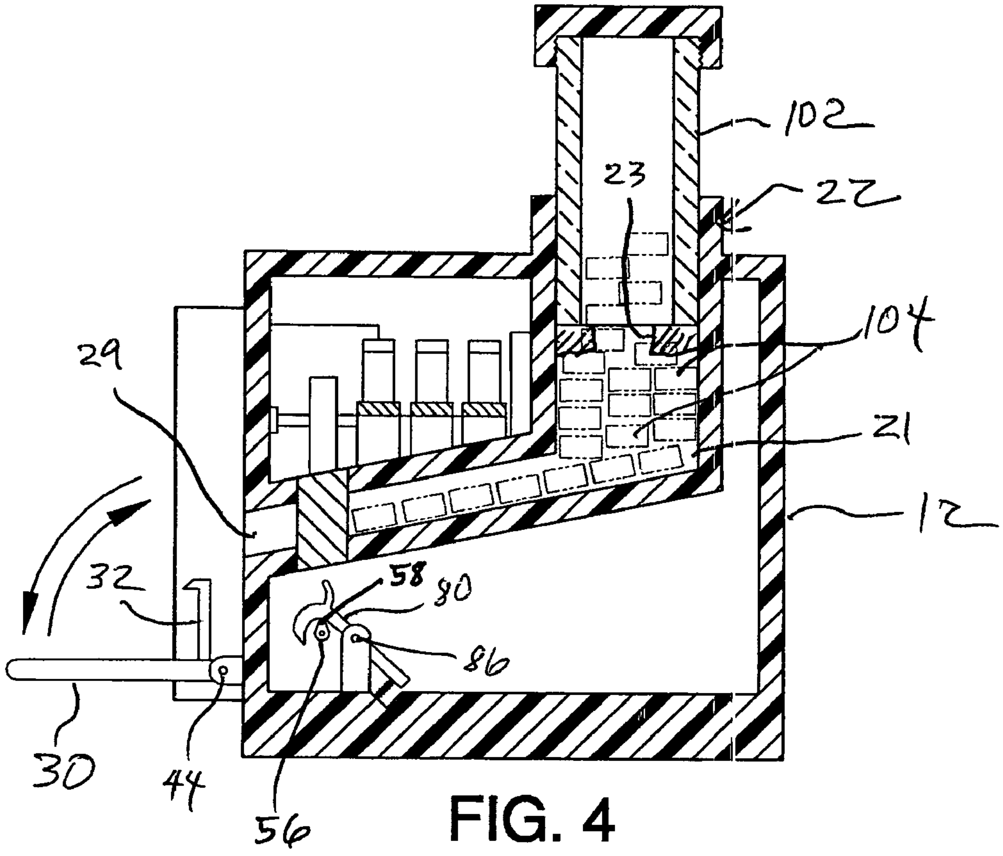
FIG. 4 is an end cross sectional view of the invention of FIG. 1, taken along the line 4—4.

Referring to FIG. 1, the invention 10 comprises a parallelepiped case 12. A 24 hour labeled electric clock 14 is disposed within the case 12. The clock 14 is visible from the exterior of the case 12. A card slot 20 is disposed within the exterior of the case 12. A thumb print recognition pad 94 is disposed proximal to the card slot 20. The pad 94 provides for secure use of the invention 10, especially in an environment where others may be often present. The recognition pad communicates with the processor 50 for proper identification of a user. A punch card 24 is prepared for insertion within the slot 20. The punch card 24 displayed has four vertical columns 27. Each column 27 comprises a medication number 25. The numbers 25 comprise one, two, three, and four, respectively, in each of the four columns 27. Punch holes 26 in each column 27 are below each number 25. As example, one punch hole 26 is in the one column 27. Two punch holes 26 are in the two column 27. Four punch holes 26 are in the a column 27. Punch holes 26 are dictated by the card 27 print out. Four reminder tabs 30 are disposed on the exterior side of the case 12. The reminder tabs 30 remind a user which medications 102 to take by folding out for display of the tab label 46 (FIG. 3). Each medication 102 is disposed within a pill bottle 100. Each pill bottle 100 is removably disposed within a bottle well 22. Four spaced apart bottle wells 22 are disposed on the top of the case 12. The bottle wells 22 are in line with and above each corresponding reminder tab 30. Each reminder tab 30 has a tab label 46 (FIG. 3). Each tab label 46 is on the tab face 36 of the reminder tab 30. Each catch arm 34 removably fits into a catch arm orifice 42 from which timely release occurs by virtue of the invention 10 function. Each drop slot 29 then releases a medication reminder 1024 (FIG. 4). Reminders 104 are held within the reservoirs 21. Reservoirs 21 are refillable by fill holes 28 (FIG. 2). Shelves 23 prevent pill bottles 100 from entering reservoirs 21. Troughs 29 deliver reminders 104 to the exterior of the case 12. Each alignment tab 38 removably fits into an alignment slot 40 of the case 12. Each tab 30 is pivotally mounted to the case 12 via the tab pivot 44. Each label 46 corresponds to a medication number 25 on the punch card 24. Each reminder tab 30 further comprises an alignment knob 38 on the distal end of the reminder tab 30. The alignment knob 38 corresponds with the alignment slot 40 in the side of the case 12. One tab 30 is in the upward, un-pivoted position. The outlet plug 18 provides power to the power cord 16 which powers the invention 10. The thumb print recognition pad 94 is disposed on the top of the case 12. The thumb print recognition pad 94 provides security in the use and programming of the invention 10.

Referring to FIG. 2, the card slot 20 is adjacent to the card reader 52 within the case 12. The card reader 52 communicates with the processor 50 within the case 12 (FIG. 3). Bottle wells 22 removably hold bottles 100.

Shelves 23 support the bottles 100. The fill hole 28 is below each bottle 100 such that the reservoirs 21 can be filled with reminders 104 (FIG. 4). The processor 50 communicates with the clock 14 and the motor 54. The motor 54 drives the rack 60. The rack 60 drives the camshafts 56. The camshafts 56 are geared to appropriately release reminders 104 through troughs 29 (FIG. 1). The camshaft 56 for reminder tabs 30 is also driven by the rack 60.

Figure 5:
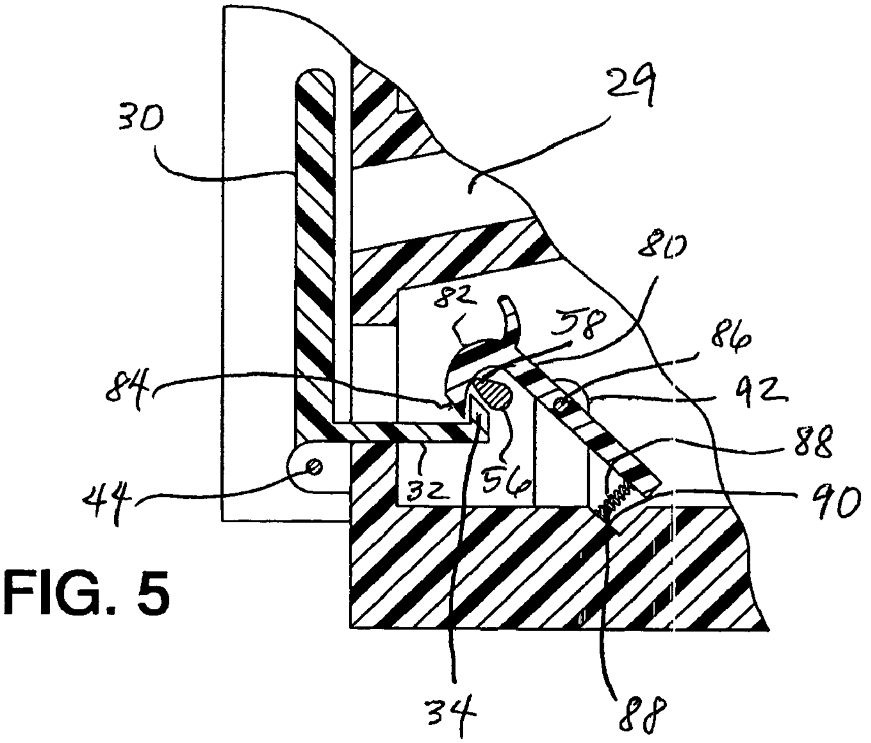
FIG. 5 is a cross sectional view of the invention of FIG. 3 of cam actuated operation of reminder tabs, taken along the line 5—5.

Referring to FIGS. 3, 4, and 5, the cam lobes 58 cause the release of the reminder tabs 30. The exemplary camshaft 56 comprises a single cam lobe 58. Multiple cam lobe outputs (not shown) operate in exactly the same fashion. The single cam lobe 58 drives the 1 daily reminder tab 30. Multiple cam lobes drive multiple daily reminders such as are indicated by tab labels 46. The reminder tab 30 is medially joined with the right angle 32. The end of the right angle 32 is joined with the catch arm 34. The catch arm 34 is controlled by the arm lock 84 of the cam lever 80. The cam lever 80 pivots about the lever pivot 86 which is supported by the pivot post 92. The cam lever 80 extends upwardly from the pivot to bend into the lever loop 82. The lever loop 82 terminates in the arm lock 84. The compression spring 88 rests on spring rest 90 and presses against the lower end of the cam lever 80. As a cam lobe 58 such as the single cam lobe 58 is rotatably cycled, the inside of the cam lever 80 is acted upon. The arm lock 84 thereby releases the catch arm 34, triggering the downward pivot of the reminder tab 30. After the cycle, a user pushes the reminder tab 30 back into position with the cam lever 80.

The compression spring 88 causes the cam lever 80 to retain the reminder tab 30 until the camshaft 56 again triggers the release of the reminder tab 30.

Each reminder tab 40 pivots downwardly when dictated by the punch card 24 via the processor 50 and the motor 54, thereby reminding a user of which medications are to be taken when. The camshafts 56 for the reminder 104 delivery are geared to open the reservoirs 21 to the troughs 29 so that reminders 104 can be delivered as per each medication's 102 daily dosage schedule. Camshaft supports 59 support the reminder tab 30 camshafts 56. The flat shaped reminders 104 fall from each trough 29 upon the reminder tabs 30. Where other shaped reminders 104 are utilized, in other examples of the invention 10, reminder tabs 30 are shaped to contain the reminders 104.

With respect to the above description then, it is to be realized that the optimum dimensional relationships for the parts of the medication reminder apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A medication reminder apparatus, the apparatus comprising:
   - a parallelepiped case;
   - an electric clock within the case;
   - a processor within the case, the processor communicating with the clock;
   - an electronic punch card reader within the case, the punch card reader communicating with the processor;

at least one punch card;

at least two columns on the punch card, each column comprising:

a medication identification;

at least one punch hole in the column below the identification, each punch hole read by the punch card reader;

a card slot within the case for card access to the punch card reader;

a thumb print recognition pad, the pad communicating with the processor;

powering means for the apparatus;

reminder means for signaling the punch card readings, the reminder means on an outside of the case, whereby a user is reminded of which medications are to be taken when.

2. The invention in claim 1 wherein the clock is labeled with the 24 hours in a day.

3. The invention in claim 2 wherein the powering means for the apparatus is standard electric outlet voltage.

4. The invention in claim 2 wherein the powering means for the apparatus is a replaceable battery.

5. The invention in claim 2 wherein the powering means for the apparatus is solar power.

6. The invention in claim 3 wherein at least two medication wells are disposed on a top of the case, the wells for containing typical medicine bottles.

7. The invention in claim 4 wherein at least two medication wells are disposed on a top of the case, the wells for containing typical medicine bottles.

8. The invention in claim 5 wherein at least two medication wells are disposed on a top of the case, the wells for containing typical medicine bottles.

9. A medication reminder apparatus, the apparatus comprising:

a parallelepiped case;

an electric clock within the case;

a processor within the case, the processor communicating with the clock;

an electronic punch card reader within the case, the punch card reader communicating with the processor;

at least one punch card;

at least two columns on the punch card, each column comprising:

a medication identification;

at least one punch hole in the column below the identification, each punch hole read by the punch card reader;

a card slot within the case for card access to the punch card reader;

a thumb print recognition pad, the pad communicating with the processor;

electrical powering means for the apparatus;

reminder tabs disposed on the exterior of the case, the reminder tabs for reminding a user which medications to take when;

a tab pivot pivotally mounting each reminder tabs to the case, each tab pivot corresponding to a medication identification on the punch card, whereby each tab pivots downwardly when dictated by the punch card via the processor, thereby reminding a user of which medications are to be taken when.

10. The invention in claim 9 wherein the tabs are disposed on a side of the case.

11. The invention in claim 10 wherein each reminder tab further comprises a tab face, the tab face visible when the tab is pivoted downward;

a label on the tab face, the label corresponding to a medication on the punch card, the label indicating how many tablets are to be taken.

12. The invention in claim 11 wherein at least two medication wells are disposed on a top of the case, the wells for containing typical medicine bottles, each well disposed above a corresponding tab.

13. A medication reminder apparatus, the apparatus comprising:

a parallelepiped case;

an electric clock within the case, the clock visible from an exterior of the case;

a processor within the case, the processor communicating with the clock;

an electronic punch card reader within the case, the punch card reader communicating with the processor;

at least one punch card;

at least four columns on the punch card, each column comprising:

a medication identification, the identifications comprising one, two, three, and four;

punch holes in each column below the identification, one punch hole in the one column, two punch holes in the two column, three punch holes in the three column, and four punch holes in the four column, the punch holes read by the punch card reader;

a card slot within the case for card access to the punch card reader;

an electric motor within the case, the electric motor communicating with the processor;

a rack driven by the motor;

a pinion driven by the rack;

a camshaft in direct drive by the pinion;

at least four lobes on the camshaft, the lobes comprising:

a single lobe cam output;

a dual lobe cam output;

a triple lobe output;

a quadruple lobe output;

reminder tabs pivotally mounted on the exterior of the case, each tab corresponding to a medication identification on the punch card, the reminder tabs for reminding a user which medications to take when, the reminder tabs comprising:

a 1 daily tab driven by the single lobe cam output;

a 2 daily tab driven by the dual lobe cam output;

a 3 daily tab driven by the three lobe cam output;

a 4 daily tab driven by the four daily cam output;

a thumb print recognition pad, the pad communicating with the processor;

electrical powering means for the apparatus;

whereby each tab pivots downwardly when dictated by the punch card via the processor and the motor, thereby reminding a user of which medications are to be taken when.

* * * * *